March 12, 1963  E. W. ROBERTSON  3,080,899
TIRE MOUNT AND GAUGING MEANS FOR BUFFING MACHINE
Filed Sept. 14, 1959  5 Sheets-Sheet 1

FIG_1

INVENTOR.
ELMER WESLEY ROBERTSON
BY
Hansen and Lane,
HIS ATTORNEYS

INVENTOR.
ELMER WESLEY ROBERTSON
BY
Hansen and Lane
HIS ATTORNEYS

March 12, 1963  E. W. ROBERTSON  3,080,899
TIRE MOUNT AND GAUGING MEANS FOR BUFFING MACHINE
Filed Sept. 14, 1959  5 Sheets-Sheet 5

FIG_14

FIG_15

INVENTOR.
ELMER WESLEY ROBERTSON
BY
Hansen and Lane
HIS ATTORNEYS

United States Patent Office 3,080,899
Patented Mar. 12, 1963

3,080,899
TIRE MOUNT AND GAUGING MEANS FOR BUFFING MACHINE
Elmer Wesley Robertson, Berkeley, Calif., assignor to Elrick Rim Co., Inc., Oakland, Calif.
Filed Sept. 14, 1959, Ser. No. 839,706
9 Claims. (Cl. 144—288)

This invention relates to tire buffing equipment and more particularly to a tire mount, support and gauging means for precision buffing of rubber tires.

The art of tire buffing is replete with articulatable means for supporting tire carcasses adjacent a motor driven buffing drum for tangent engagement therewith to remove tread rubber from the tire preparatory to vulcanization of recap rubber onto the periphery of the tire body.

While these prior known tire buffing machines have been thought satisfactory, they leave much to be desired by reason of irregular buffing; their failure to properly gauge the diameter, crown contour and/or crown width of the buffed tire. In many of the prior devices the tire carcass is buffed out of round resulting in either bad curing of the recap rubber due to too thick or too thin a layer of recap material. For example, in recapping tires, the buffed carcass is placed in a matrix or mold with recap rubber or "camel back" applied to the periphery of the tire. The matrix is accurately diametered but if the buffed tire body is out of round or the buffed surface irregular there will be a variance in spacing between the irregular zones of the tire body and the matrix walls. This results in thin spots wherein the recap rubber is compressed too much so as to become hardened and therefore badly cured. Contrariwise if the space between the buffed tire and matrix is greater than required the recap rubber may become spongy and/or soft. In either case the wear of such hard and/or soft zones of recap rubber becomes excessive during use resulting in less than the quality job expected by the tire owner or user.

The present invention contemplates the provision in tire buffing equipment of means facilitating, during buffing, the attainment of a true round, a proper diameter, a correct crown contour and crown width as well as a low shoulder upon the buffed tire body so as to assure a complete and uniform covering and curing of the recap rubber applied thereto.

It is another object of this invention to provide a split rim support for the tire to be buffed facilitating quick mounting and demounting of a tire thereon. In this connection it is a further object to provide step-up rims for each rim half to accommodate them for tires of greater rim diameter.

Yet another object is to provide an openable fork or yoke support for the split rims and means for latching the arms of such fork or yoke together when a tire is properly positioned between the split rims. In this connection each arm of the openable fork has one half of the split rim secured to a half spindle journaled thereon for movement therewith and for axial alignment with each other when the fork is closed upon a tire to be buffed. It is also an object to provide means on each half spindle for changing the width of rim, i.e., the distance between rim halves, to suit the split rim for receiving and supporting tire casings of various widths.

In connection with the split rim feature of the present invention it is another object to provide means for inflating the tire mounted thereon to a limited pressure such as to bring it into a shape or form comparable to its natural state while mounted on the wheel of a vehicle. In this manner the tire is brought into shape for firm engagement with the buffing wheel or drum.

The present invention also includes means for indicating the depth of cut or removal of old tread rubber from the tire during buffing. By this arrangement there is provided means for gauging the diameter of the buffed tire and incidental thereto attaining true round of the periphery of the buffed tire preparatory to the application of recap rubber thereto. In this manner the proper thickness and curing of recap rubber to such true round buffed tire with respect to the vulcanizing matrix or mold is assured.

This attainment of proper curing and application of recap rubber to the periphery of a tire casing further entails a gauging or determination of buffed crown contour or radius, buffed crown width and a preparation of the shoulder of the tire to a proper shape for feathering out the recap rubber from the crown down to the scuff bar thereof. To this end there is provided a preset gauge adapted to engage the periphery of the tire during buffing thereof whereby the person operating the buffer can detect when the tire has been buffed to the proper diameter, is true of round, has the proper crown contour and width.

These, and other objects and advantages of the present invention will become apparent from a reading of the following description in connection with the drawings in which.

GENERAL

In general the present invention is embodied in a tire buffing arrangement of the type in which a tire to be buffed is supported for rotation on horizontal spindles journaled in a support swingable in a horizontal plane whereby the periphery of the tire is presented for tangent engagement with a power driven buffing drum supported on an adjacent arbor.

Figure 1:
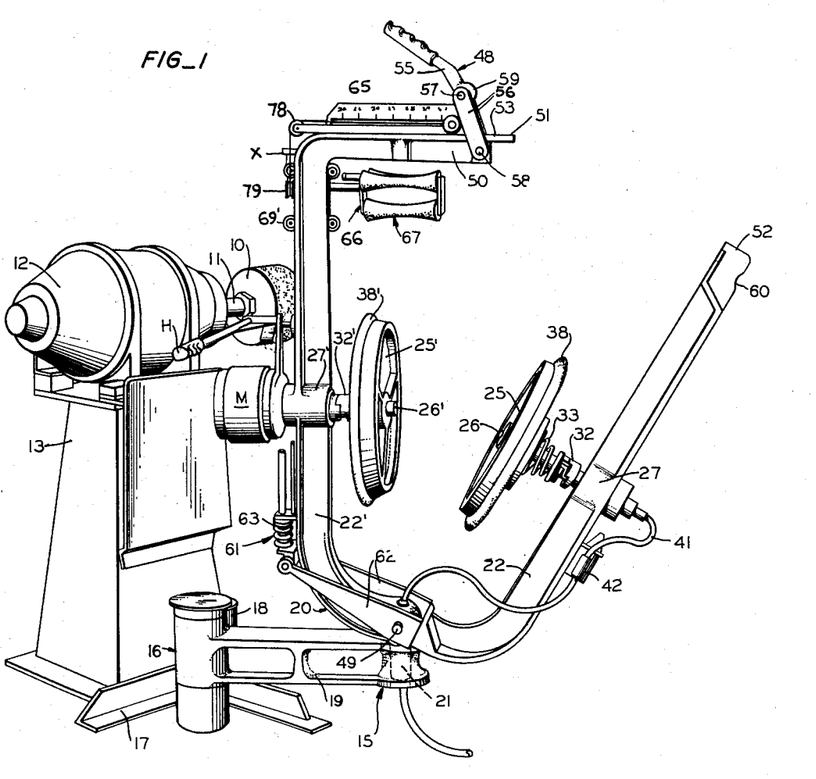
FIG. 1 is a perspective view of a tire buffing arbor having the tire support and gauging means of the present invention embodied therein.

More specifically, referring to FIG. 1, the overall arrangement is associated with a buffing drum 10 disposed for rotation on a horizontal arbor 11 powered by a motor 12 and supported on a standard 13. The tire mount embodying the present invention, generally designated 15, is supported adjacent the arbor 11 in the usual manner so as to present the periphery of a tire to be buffed for tangent engagement with the rasping face of the buffing drum 10.

Tire Support

The support 16 for the tire mount 15 consists of a pedestal 17 having a pair of pivoted arms 18 and 19 pivotally mounted thereon for swinging movement in a horizontal plane. A tire supporting frame in the form of a fork-like yoke 20 has a vertical pin 21 at its bight pivotally mounted at the end of the outer most arm 19 so that the yoke can be rocked about horizontally relative to the dual swing arms 18 and 19. In this manner the yoke 20 provides a pair of upright legs 22 and 22' between which to support a tire T. The tire T is adapted to be supported on a pair of disc wheels providing half rims 25 and 25' each mounted on a half spindle 26—26', respectively, each journaled midway up a respective one of the upstanding legs 22 and 22' of the yoke 20. To this end each leg 22 and 22' is provided with a boss 27—27' housing a roller bearing 28—28' and having thrust bearings 29—29' (FIG. 9) on their inner sides against which a collar 30—30' on the half spindles 26—26' respectively bears.

Figure 2:
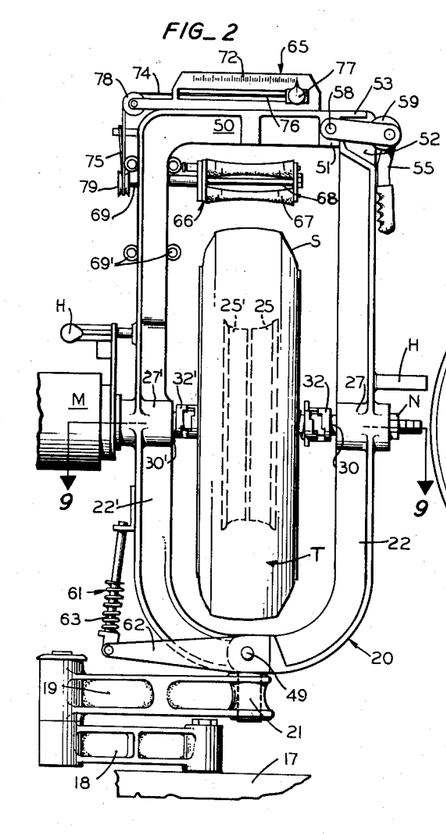
FIG. 2 is an elevational view of the tire support of the present invention with a tire supported therein.
Figure 3:
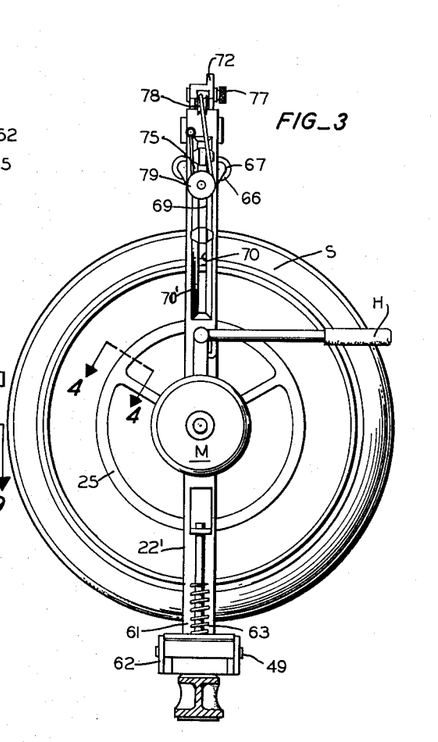
FIG. 3 is a side view of FIG. 2.

The outer end of half spindle 26' is keyed to and coaxially of a drive shaft drivingly connected to a motor M. In the disclosure of FIGS. 1, 2 and 3 the motor M has its housing secured to the arm 22' flush with outside face of the boss 27' thereon. The outer end of the other half spindle 26 is threaded to receive a nut N which bears against the outer face of the boss 27 on the arm 22. The inner end of half spindle 26' has an axial bore 31' adapted to receive a reduced, beveled end 31 of the other half spindle 26 when the yoke 20 is in closed condition.

The two half rims 25 and 25' are identical and interchangeable and for this reason are releasably mounted on the respective half spindle 26 and 26'. This is important from the standpoint of adapting the tire support for tires of larger and/or smaller diameter.

Figures 9, 10, 11, 12:
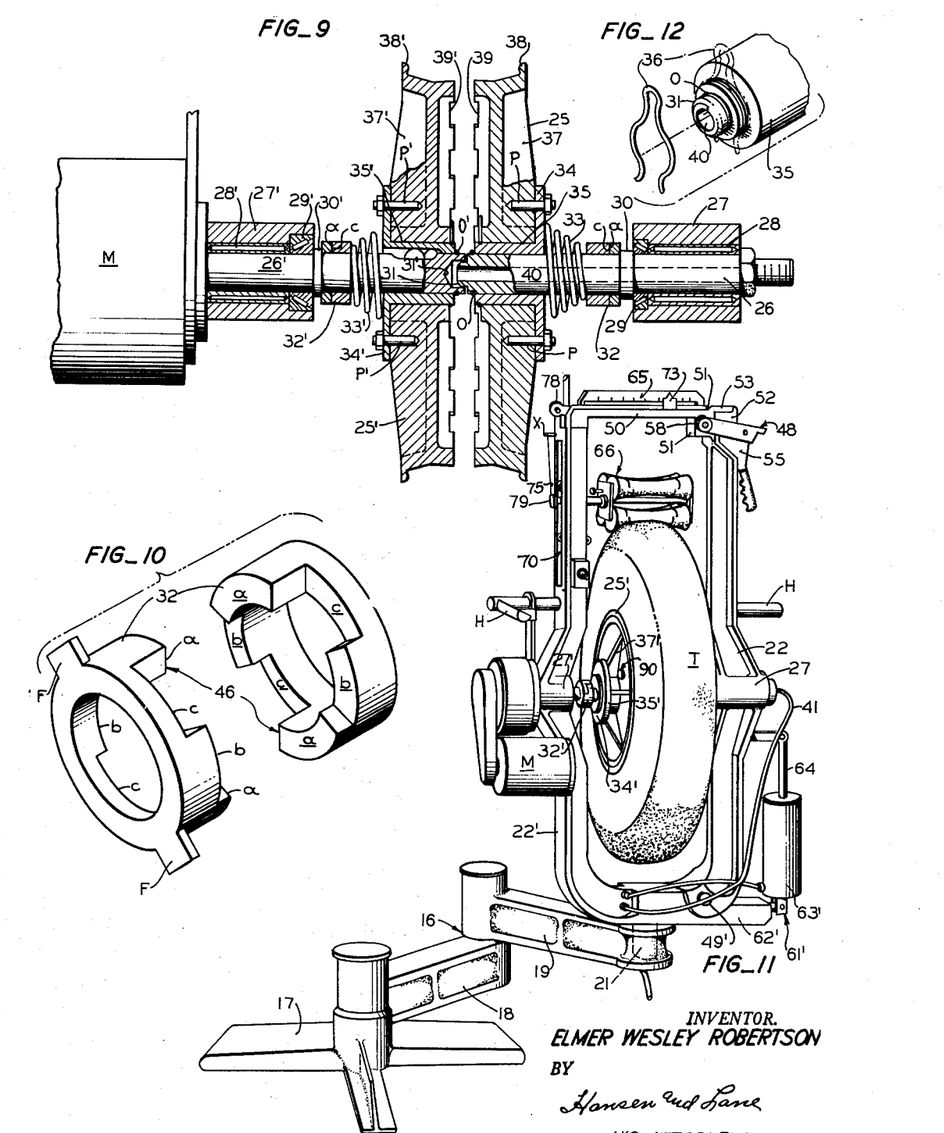
FIG. 9 is an enlarged section taken through FIG. 2 along line 9—9 thereof.
FIG. 10 is a perspective view of the tire width shims or collars shown in FIGS. 2 and 9.
FIG. 11 is a perspective view of the entire assembly in position for operation.
FIG. 12 is a fragmentary perspective view of the inner end of a spindle.
Figure 13:
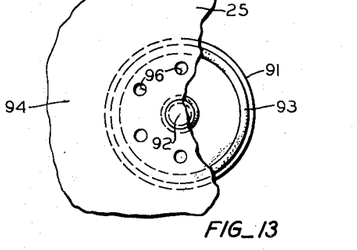
FIG. 13 is a fragmentary elevation of part of FIG. 4.
Figure 14:
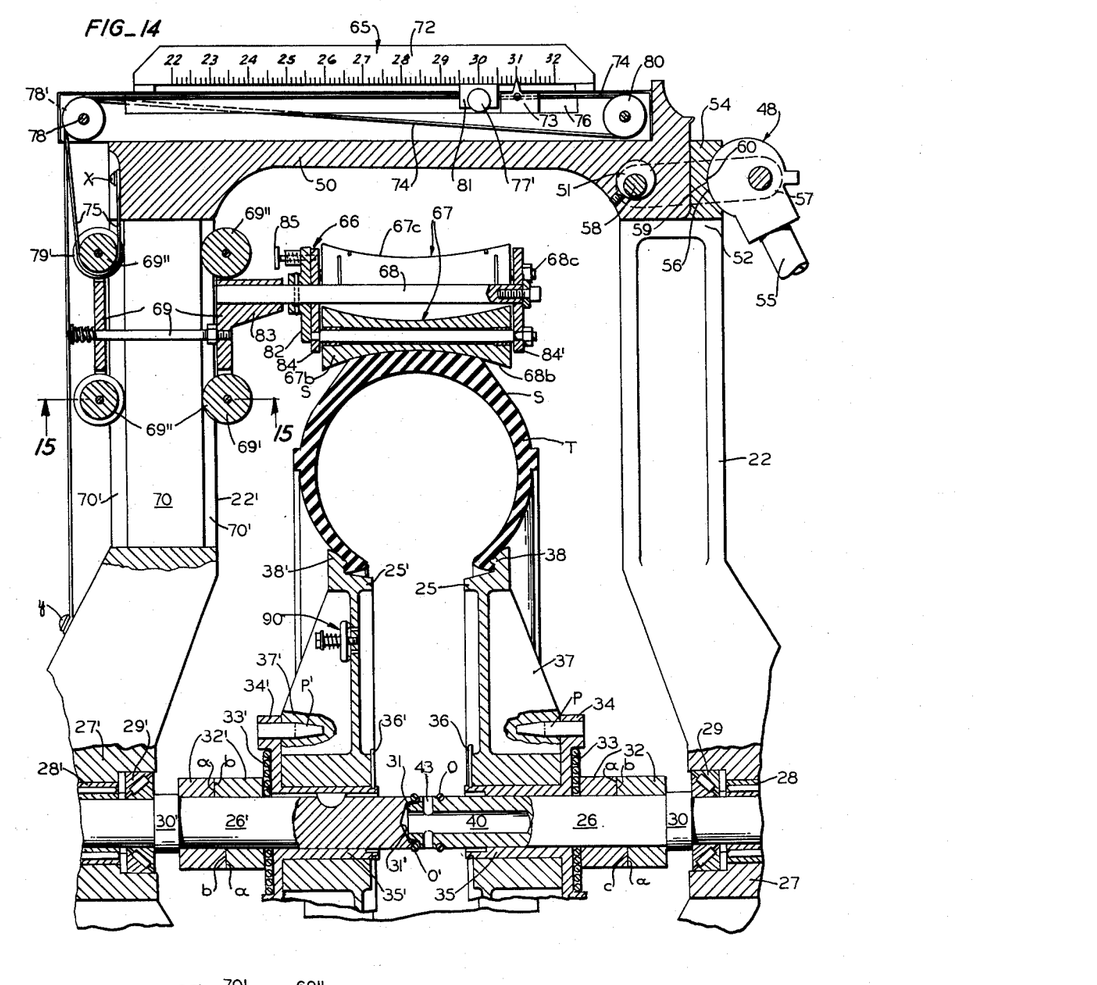
FIG. 14 is a partial section of the assembly showing a modified form of gauging means.

As best seen in FIGS. 2, 9 and 10 spreader type collars 32—32' are provided on each half spindle for adjusting the width of rim to suit tires of various widths. These spreader collars bear against the collar 30—30', respectively, on the half spindles 26—26' and form the base against which the small convolute of a spiral spring 33—33' bears. The spiral springs are compression type springs in which the smaller convolutes normally expand away from the larger convolutes at the opposite end. These springs 33—33' when expanded assume a somewhat frusto conical form as shown in FIG. 9 but when fully compressed as shown in FIG. 14 they are flat, all convolutes being in the same plane. The opposite or larger convolute of the spring 33—33' bears against a flanged end 34—34' of a hub 35—35', which is mounted on the respective half spindle 26—26' and adapted to receive the respective rim half 25 and 25'. The hub 35 is keyed to its spindle shaft 26—26' as seen in FIG. 9 and each hub 35—35' is pressed against the spiral spring 33—33' and secured longitudinally of the spindle 26—26' and against removal therefrom under the influence of the spiral spring by a neoprene washer or O ring 0—0'.

Replaceable Rims and Rim Diameter

The half rim 25 or 25' by the same token is secured to the hub 35 or 35', respectively, by a snap ring 36—36' which seats in an annular groove formed adjacent the inner end of the particular hub 35—35' with which it is associated. Each flange 34—34' has an inwardly extending pin P—P' radially arranged thereon about the hub 35—35' so as to extend in bore provided in web-like spoke 37—37' of the respective half rim 25—25' for turning the same with the hub. Since the hub 35' is keyed to the half spindle shaft 26' which is drivingly connected to the motor M it will be appreciated that when a tire T is mounted on the half rims 25—25' to couple them, their hubs and spindle shafts will turn in unison.

The split rims 25—25' each have a tire bead engaging flange 38—38' for maintaining the tire in engagement therewith and as will be noted in FIG. 9 each rim half 25—25' has a serrated inner face 39—39' such that although these faces engage each other, air can pass from the space between the rims into the cavity of the tire body. In this connection note that one of the half spindles 26 has a center bore 40 communicating with an air supply conduit 41 in turn communicating with a source of constant air supply (not shown). This air supply conduit 41 has an air regulator 42 in line with it to limit the air supply to a predetermined admittance valve. Note also that each of the rim halves 25—25' is formed on a solid disc so that air passing through the bore 40, and escaping therefrom via ports 43 into the space between the discs and rims 25—25', flows into the cavity of the tire T to inflate it even during rotation.

Safety Valve

Figure 4:
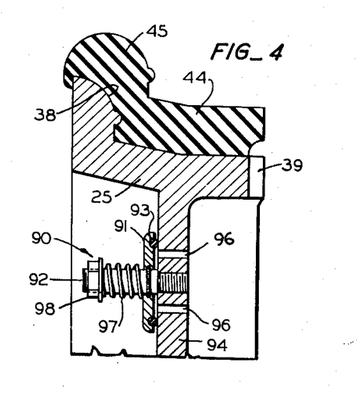
FIG. 4 is an enlarged fragmentary section through the periphery and web of one of the half rims.

In providing a source of constant air supply under pressure to the space between the discs and rims 25—25' to inflate the tire thereon it has been found that a pressure beyond an allowable limit should be avoided to assure against accidental over inflation of the tire. A pressure of 5 pounds per square inch is sufficient to brace the tire for buffing and any pressure beyond 12 pounds per square inch may unduly strain the seal between the tire beads and half rims or put an undue stress on the tire supporting frame. For these reasons it is desirable that a safety blow out plug or some form of relief valve be provided to assure against excess pressures building up within the tire and space between the discs of the rim halves 25—25'. Such a relief valve is shown at 90 in FIG. 4. The construction consists of a cap 91 mounted for sealed sliding movement on an outwardly extending stem 92 threaded to the disc wheel. The cap 91 has a sealing washer or ring 93 embedded therein to engage the outside wall of the disc 94 around a plurality of ports or apertures 96 formed in the disc 94. The outer end of the stem 92 is threaded and has a compression spring 97 thereon engaged by a nut 98 on the outer end of the stem. By this arrangement pressures built up between the two disc wheels bears against the full surface of cap 91 via the ports 96 to force the cap 91 and washer 93 away from the disc 94 to thereby relieve pressure within the tire cavity and between the spaced rims and discs. The spring 97 is calculated to yield at the desired pressure (5 pounds) and the plural ports 96 are of a combined area to counteract the load of the spring 97 so as to assure relief of pressure and to maintain a seal during drop in pressure.

Step-Up Rings

The foregoing arrangement is suited within limits for receiving and supporting tires of various rim diameter as well as various rim width. For example the half rims 25—25' of themselves are diametered to receive, say, a tire rim of 15 inch diameter. Each rim half has a rim flange 38—38' against which the bead of the tire T can engage. Should it be required that a tire of 16 inch diameter be placed on these rims 25—25', I have provided step-up rings, each adapted to have stretch fit with a rim 25 or 25' one 44 of which step-up ring is illustrated in section in FIG. 4. The step up rings are made of rubber which must be stretched to fit over the metal rings. In this manner an air seal is provided between the rims 25—25' and the respective step up rings 44 thereon. Moreover, with rubber rings 44 the inflated tire thereon tends to compress these rings to assure a good air seal.

Each step-up ring 44 is identical and presents a bead flange 45 adapted to conform to the bead of the next larger tire to be received. There may be another step-up ring placed over the step-up ring 44 to suit the split rims to receive the next larger diametered tire.

*Spreader Collars—Compensation for Tire Widths*

Tires also vary in width, i.e., the distance between rim beads thereof may be wide or narrow. For example, tires may be divided into three groups so far as width of rim is concerned, namely, group A 5.90 to 6.70, group B 7.10 to 8.00 and group C 8.50 to 9.50, these measurements being the size in inches of the cross section of the tire cavity. To compensate for such variations in the width of tires, the spreader collars 32—32' are such as to enable the split rims 25—25' to slide outwardly from vertical center of the yoke a greater or lesser distance. To this end each set of collars 32—32' consists of a pair of collars having their abutting faces 46 segmentally notched to provide stepped planar recesses at three different levels of abutment between them. As illustrated in FIG. 10 the abutting faces 46 of each spreader collar are divided into six segmental areas in which diametrically opposite areas, a, b and c are paired off and disposed at different planes or depths of recess relative to the outer faces of the collar members 32 or 32'. The segments are interfitting so that the areas a, b and c are disposed for interchangeable abutting relation with respect to each other so as to coordinately compensate for the various width groups A, B and C of tire diameter.

For example, when a tire of narrow rim width group A (5.90 to 6.70) is to be mounted on the half rims 25—25', each set of spreader collars has one half collar disposed with its segmental zones a in engagement with the zone a of the other mating half collar, as illustrated in FIGS. 10 and 2. In this manner each set of spreader collars is longest, longitudinally of the half spindle shaft 26 or 26' upon which it is mounted so that the half rims 25—25' are limited to the least spreading relative to each other. However, if the tire to be mounted on the split rims is of greater width, say in the next width group B of 7.10 to 8.00, one half collar is turned 60 degrees relative to its mating half collar so that the segmental zone a of one half collar is in abutting relation to the zone b of its mating half collar. This would allow the half rims 25—25' to spread relative to each other partially but not fully. By the same token if a tire of the wider group C (8.50 to 9.50) were to be mounted on the half rims 25—25' the spreader collars 32—32' would have their mating halves disposed such that the zones a of one half would abut the zones c of the other or mating half collar as illustrated in FIG. 9. Thus the spreader collars 32—32' are set for their shortest length and allow the half rims 25—25' to spread the greatest distance relative to each other to accommodate the wider group of tires.

In connection with the foregoing it should be borne in mind that the spiral spring 33—33' is interposed between the spreader collar 32—32' and the rim half 25—25', respectively, when the deflated or relaxed tire body is mounted on the split rims. However these spiral springs will yield when pressure builds up in the tire to cause the tire to spread the rim halves until the spiral springs are fully compressed, i.e., flattened out as shown in FIG. 14, between the hub 35—35' and the collar 32—32' which limits outward movement of the split rims.

By the same token these spiral springs 33—33' bear with considerable pressure against the innermost one of each pair of spreader collars 32—32' so as to maintain each pair of collars in abutting relation regardless of which segmental area a, b or c of one half collar abuts whatever segmental area a, b or c of the other. Note that one of the half collars has diametrical finger tabs F by which to compress the spring 33 or 33' as well as to facilitate turning such half collar relative to the other during adjustment.

At all events it will be appreciated that all tires, regardless of variations in width, are mounted on the split rims in accurate vertical center of the yoke 20, i.e. the pivot pin 21 thereof.

*Openable Yoke*

Having thus described the nature and construction of the tire mounting spindle and wheel I shall now explain the support yoke 20 therefor in details more pertinent to the present invention. Contrasting FIG. 1 with FIG. 2 it will be noted that the support yoke 20 of the present invention is openable to receive a tire to be mounted on the wheel made up of the split rims. In combination therewith I have provided means 48 for releasably latching the openable arms 22—22' of the yoke in closed condition.

To accomplish the openability of the yoke one arm 22 thereof is pivotally mounted as at 49 for movement relative to the other arm 22' at the bight of the yoke, i.e., adjacent the vertical pin 21 by which the yoke is mounted upon the dual arms 18—19 for horizontal swinging. It will thus be appreciated that the arm 22 is movable while the other arm 22' is stationary although both are swingable as a unit or common yoke.

The latch means 48 is at the upper or opposite ends of the yoke arms 22—22' for binding them together in spaced parallel relation. To this end the stationary arm 22' has a bridge piece or cross brace 50 formed integrally therewith so as to extend laterally therefrom to present one end 51 thereof for abutting relation with the free end 52 of the other or movable arm 22. The cross brace 50 has a flat flange 53 on its end 51 which is slotted to receive a vertical flange 54 formed on the free end 52 of the movable arm 22 to align the yoke arms with each other. A latch arm 55 pivotally mounted at 57 between parallel linkages 56 which in turn have their opposite ends embracing the end cross brace 50 pivotally connected as at 58 to the end 51 of the brace 50. In this manner the spaced linkages 56 are swingable over the free end 52 of the movable arm 22 to position the latch arm 55 for engagement therewith.

The latch arm 55 has a cam formation 59 eccentric of its point of pivotation 57 adapted to engage in a recess 60 formed on the edge of the upper free end 52 of the movable arm 22. The arrangement is such that when the latch arm 55 is turned upward the linkages 56 and cam 59 can pass over the upper end 52 of arm 22 and when latch arm 55 is swung by hand downwardly its eccentric cam 59 engages in the recessed edge 60 of arm 22 to bindingly latch the movable arm 22 against the cross bridge 50 of the yoke.

From the foregoing it will be appreciated that a tire T is easily mounted on the half rims 25—25' which are carried by the respective arms 22—22' of the yoke. The workman need merely open up the yoke, place the tire on one rim half and close the yoke and latch the arms together. Thus it will be seen that the tire is completely encompassed by the closed yoke which moves as a unit about its vertical mounting pin 21 to present the periphery of the tire to the buffing drum 10.

Suitable handles H on each arm 22—22' (FIG. 11) serve for the grasp and guidance by the hands of the person operating the buffer.

In conjunction with the openability of the yoke 20 it should be noted that I have provided a cushioning means 61 to alleviate shock to the pivotal connection between the yoke arms when the latch 55 is opened and the movable arm 22 allowed to drop away into open position. As seen in FIGS. 1, 2 and 3 the cushioning means 61 may consist of an extension 62 on movable arm 22 and a compression spring 63 between the end of the extension 62 and the adjacent stationary arm 22' of the yoke. The arrangement is such that when the movable arm 22 swings away from the stationary arm 22', the compression spring 63 serves to take up the momentum of such movement. Another form of cushioning means 61' is shown in FIG. 11 in which the stationary arm 22' has an extension 62' to which one end of a hydraulic cylinder 63' is pivotally attached, the piston rod 64 of such hydraulic cushioning means being pivotally connected to the movable arm 22 so as to cushion the drop of the latter as it swings toward open position.

Tire Gauging

The present invention embodies a preset gauge 65 including a template disposed on a turret 66 to selectively engage the tire T so as to visually aid the operator in determining when buffing is complete.

Figures 5, 6, 7, 8:
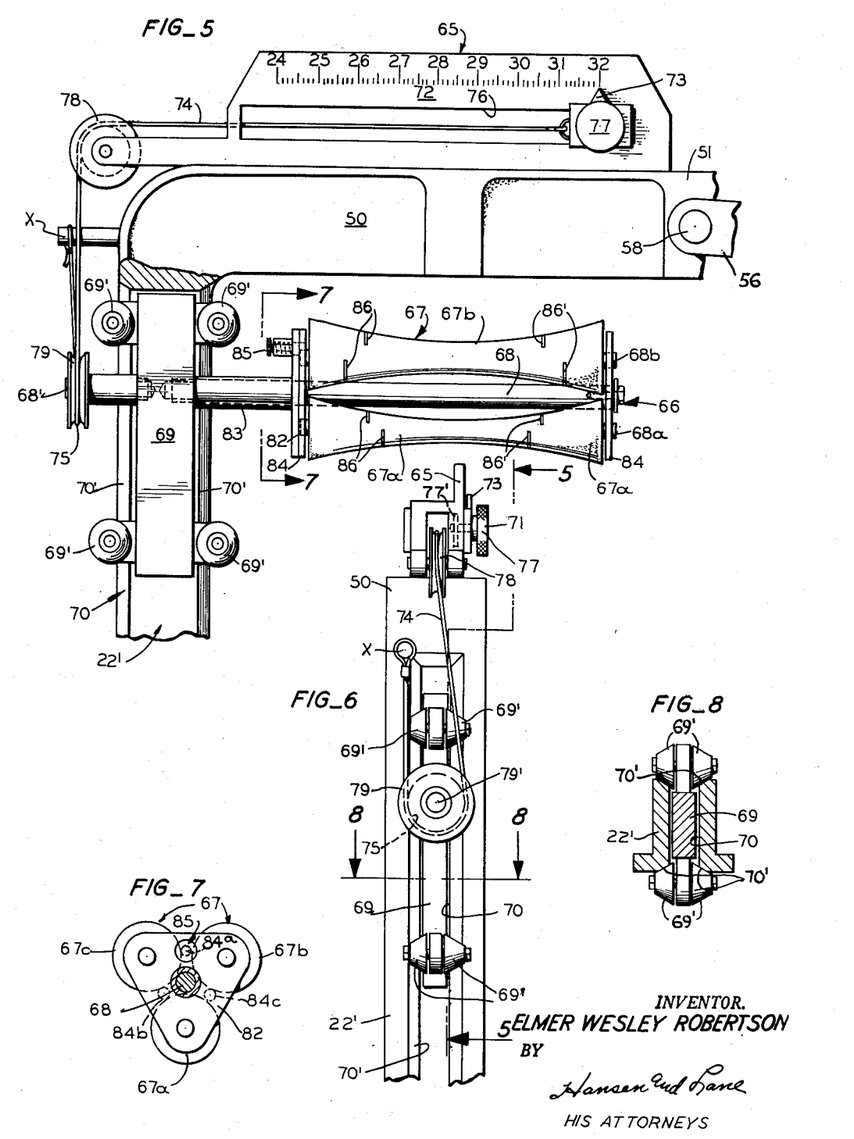
FIG. 5 is an enlarged elevational view of the gauging means of FIG. 2.
FIG. 6 is a side view of FIG. 5 which is an enlarged detail of the gauge means seen in FIG. 3.
FIG. 7 is a section through FIG. 5 taken along line 7—7 thereof to show a turret mount for the gauging rollers.
FIG. 8 is a section through FIG. 6.

Referring to FIGS. 5 and 7 the turret 66 carries a plurality of rollers 67 each a template for reasons later to be explained. Suffice it at this point to say that a roller 67 mounted for rotation on a shaft 68 which extends parallel to the spindle shafts 26—26' above the tire T so as to move by gravity radially toward the latter. The shaft 68 is carried by a rider 69 guided for up and down movement in a track 70 provided on one arm of the yoke, preferably the stationary arm 22' thereof. The track 70 consists of a vertical slot formed through the arm 22' in a plane parallel to the spindles 26—26'. The rider 69 consists of a block slidably arranged in the slot 70 and having upper and lower frusto conical rollers 69' disposed to engage beveled edges 70' formed on the arm 22' at each side of the slot 70 to keep the block in alignment with the slot. It will be noted that the roller 67 gravitates toward the periphery of the tire T to be buffed.

The present invention embodies means 71 for limiting gravitational movement of the template roller 67 toward the periphery of the tire so as to indicate to the operator that the buffing operation is complete. The limiting means 71 embodies the aforementioned preset gauge 65 which includes a full scale rule 72 mounted on top of the cross bridge 50 and a pointer 73 movable relative to the scale 72 and connected by flexible cable 74 to the rider 69 so as to coordinate the movement of the latter and the roller 67 with movement of the pointer 73 along the scale 72. As best seen in FIGS. 5 and 6 the roller 67 moves radially toward the periphery of a tire to reflect radial distance whereas the pointer 73 moves twice the distance of movement of the roller so as to afford a full scale reading of tire diameter rather than tire radius. This is accomplished by supporting the rider 69 in a loop 75 of the cable 74 rather than having one end of the cable connected directly to the rider 69.

Referring to FIGS. 5 and 6 it will be seen that the pointer 73 is formed as a part of a rider which rides in a slot 76 formed lengthwise of the scale 72. A knurled thumb nut 77 associated with the rider has threaded connection with a clamp jaw 77' on the back side of the scale 72 by which to secure the rider and its pointer 73 at any desired diameter reading along the scale when the thumb nut 77 draws clamp jaw 77' up against the scale. One end of the cable 74 is secured to the pointer and the cable extends from the pointer parallel to the scale and beyond the arm 22' of the yoke. The cable 74 is trained over a pulley 78 so as to be directed downward therefrom parallel to the vertically disposed arm 22'. The loop 75 of the cable 74 is formed in the region of the track 70 in which the rider 69 is guided for up and down movement and the opposite end of the cable 74 is anchored to an extension X just above the track 70. A sheave 79 is mounted for rotation on a stud shaft 68' secured to and extending horizontally from the rider 69 exteriorly of the yoke 20. The sheave 79 hangs in the loop 75 so that the rider 69 and roller 67 is suspended from the cable 74 to limit movement of the template toward the tire being buffed. However so long as the tread on the tire T is unbuffed to a diameter corresponding to the preset diameter reading on the scale as indicated by the pointer 73, the roller 67 bears against the periphery of the tire and is not suspended from or supported by the cable. It is only when the buffing of the tread rubber has worn the tread rubber down to the diameter desired that gravitational movement of the roller and rider is limited by reason of the sheave 69 hanging on the loop 75 of the cable 74 which is anchored to the preset pointer 73. Rotation of the roller 67 therefore ceases and this indicates that buffing of the tire is complete so far as proper diameter is concerned.

Incidental to indicating that buffing to the desired depth has been attained, since gravitational movement of the roller 67 radially toward the tire is stopped, the operator is also visually apprised as to whether or not the periphery of the tire has been buffed to a true round. The suspended roller 67 being at a fixed dimension radially from the spindles 26—26' it will be appreciated that if the tire is out of round, any high zone on the periphery of the tire will obviously engage the roller 67 and so indicate the out of round.

Figure 15:
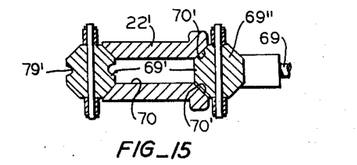
FIG. 15 is a section through FIG. 14 taken along line 15—15 of FIG. 14.

An alternate form of preset gauge is shown in FIGS. 14 and 15 in which the cable 74 has one end anchored as at X to the frame or yoke 20 above the track 70 formed in the arm 22' thereof. The cable 74 extends downwardly and around a sheave 79' formed on the upper outer set of frusto conical rollers 69" which engage the beveled edge 70' of the guide track 70. Thus the loop 75 in cable 74 forms a support for the rider 69 and turret 66 carried thereby as before. The cable 74 extends upwardly from the loop 75 around a pulley 78 and then transversely across the top of the bridge brace 50 beneath the scale 72. In this modification the cable although secured to the pointer 73 continues on around a pulley 80 journaled above the free end 51 of the bridge brace 50. Thence the cable 74 extends from the lower side of pulley 80 back to the upper side of a pulley 78' adjacent pulley 78 and thence down to an anchorage Y on the side of the frame below the track 70 formed in the arm 22' thereof.

In this arrangement it will be appreciated that when the pointer is moved along the scale the loop 75 will be lowered one half the distance of movement made by the pointer. Now while the pointer might well have means thereon such as the nut 77 in FIGS. 5 and 6 for securing it to the scale 72, in this arrangement the scale has a separate rider 81, a securing nut 77' ahead of the pointer 73 and for limiting movement of the pointer toward lesser dimensional readings. In this manner movement of the cable is limited as before and the draped loop 75 disposed to hold the rider 69 suspended to thereby limit further movement of the gauge roller 67 radially toward the tire being buffed.

Crown Contour Gauge

It will be noted in FIGS. 2, 5 and 11 that the roller 67 is not a straight sided cylinder but rather is arcuately cut to provide a template matching the desired crown contour to which the tire is to be buffed. The roller 67 is therefore cut arcuately on a radius struck from the vertical axis of the fork-like yoke 20, i.e. the plane in which the tire T rotates. It will be appreciated that the radius on which the side wall of the roller is cut will depend upon the width of tire to be buffed. There being three groups of tire width, as previously explained, I have provided three different template rollers adapted for use in gauging the crown contour of tires of the respective width groups. These three different templates or rollers are designated 67a, 67b and 67c, respectively, coordinated with the three groups of tire widths (A, B and C) as hereinbefore referred to.

The arcuate cut of the template roller 67a is, for example, struck about a six inch radius; that of the template roller 67b on a seven and a half inch radius; and the arcuate cut of roller 67c is struck from a nine inch radius. These three template rollers 67a, 67b and 67c are journaled on independent shafts 68a, 68b and 68c, respectively (FIGS. 5 and 7) each extending from the turret mounting 66 at triangularly disposed centers thereof, the turret mounting 66 in turn being mounted on the central shaft 68 secured to the rider 69 as previously explained.

The turret mounting 66 includes a fixed plate 82 welded to a sleeve 83 which is secured to the rider 69 concentric to the shaft 68. The shafts 68a, 68b and 68c for each template roller 67a, 67b and 67c, respectively, is mounted on end plates 84—84' each rotatably mounted on the central shaft 68 for rotation relative thereto. A spring urged pin 85 carried by the fixed plate 82 is disposed to enter one or another of the recesses 84a, 84b or 84c formed on the end plate 84 which is adjacent the fixed plate 82 to thereby secure the turret mount for the template rollers relative to the fixed plate 82. In this manner, any one of the template rollers 67a, 67b or 67c can be selectively positioned to engage the periphery of the tire T to be buffed.

Referring again to FIGS. 2 and 5 as well as FIG. 14 it will be noted that each of the template rollers 67a, 67b and 67c has thereon paired scribe lines 86—86'. Each of the pairs of these scribe lines 86—86' are equidistant from the vertical axis of the yoke 20 as well as the axis of the plane in which the tire is supported therein to rotate. The purpose of these scribe lines 86—86' is to set up visual sight lines during rotation of the roller 67 engaging the tire being buffed to indicate, to the operator, the crown width for the particular tire being buffed.

The crown width is that width of the arcuately buffed periphery which is most suitable for receiving recap rubber and entails the buffing of the shoulders S on each side of the tire between the crown and scuff bar on the side wall of the tire. In other words, after the operator has buffed the crown of the tire to the proper diameter as indicated by suspension of the turret rollers 67 from the cable 74 dependent upon the pointer presetting relative to the scale; and has buffed the crown to the proper contour as indicated by the matching thereof with the template roller; he turns the yoke 20 either way to a sidewise cant relative to the buffing drum 10 so as to buff the shoulders S. In buffing the shoulders S the operator matches the corner between the crown and shoulder with the particular scribe line 86 or 86' designating the proper crown width for the particular size of tire being buffed. In this manner the tire can be accurately buffed to receive the recap rubber with assurance that it will be of uniform thickness and application when the same is molded and vulcanized in the matrix.

In summary the foregoing structure is utilized as follows: The tire to be buffed is checked for size and the buffing machine adjusted for operation on that particular tire.

First if the half rims 25—25' are not suited for the particular tire to be buffed even with a step-up ring thereon, the half discs are changed by pulling off the snap rings 36—36' and sliding the disc wheels off to their hubs and pins P—P' for replacement by suitably sized half disc wheels.

Next the spreader collars 32—32' are set to limit outward movement of the half disc wheels under the influence of pressurized air therebetween, the setting of the spreader collars being dependent upon the width of the particular tire to be buffed.

The tire is then hung over the half rim 25 and movable arm 22 swung up into closed condition and the latch means 48 secured. Now air pressure is admitted via passage 41 in spindle 26 and constantly flows into the space between the half discs, the pressure building up within the tire being set at, say, 5 pounds on the safety relief valve 90.

Next the preset gauge 65 is checked to set its pointer 73 in line with the desired tire diameter reading corresponding to the depth of buffing required on the particular tire to be buffed. At this time or just before the turret on the rider 69 is checked to present the proper template roller 67 to the particular tire to be buffed. The template roller selected will then gravitate into engagement with the periphery of the tire to be buffed.

The operator now turns on the power to the motor M so as to turn the tire in a direction contra to the direction of rotation of the buffing drum 10. He now grasps the handles H on the fork-like yoke 20 so as to control the horizontal swing thereof and to force the periphery toward the buffing drum 10 for tangent engagement therewith. As the tread rubber is thus worn away from the tire the operator matches the crown contour of the tire with the arcuate surface of the template roller 67. When the tread rubber reaches a depth such that the rider 69 becomes suspended on the draped section 75 of the cable 74 any further buffing would cause a disengagement of the template roller 67 with the tire. Accordingly further buffing of the crown is stopped and buffing of the shoulders at the sides of the crown begin. In buffing the shoulders the operator visually aligns the point of convergence of the crown and shoulder with a scribe line 86 on the template roller 67 corresponding to the width of crown most suitable for the particular tire being buffed. It will here be noted that although the scribe lines 86—86' extend only segmentally about the roller 67, when the roller rotates by reason of contact with the rotating tire, these scribe lines achieve the allusion of a clear cut reference line by which to guide the operator in buffing the shoulders to the proper crown width.

Having thus described the new and improved tire buffing machine embodying the present invention it will be appreciated by those skilled in the art that the same is susceptible to variations, alterations and/or modifications without departing from the spirit of my invention. I therefore desire to avail myself of all variations, alterations and/or modifications as fairly come within the purview of the appended claims.

What I claim as new and desire to protect by Letters Patent is:

1. In a tire buffing machine in which a tire support is swingable horizontally about a vertical axis for presenting a tire tangentially to a rotary buffing drum, a fork-like yoke having vertical arms openable relative to each other, axial alignable half spindles journaled on each of said arms, a split rim including a half rim mounted for sliding movement on a respective one of said half spindles for receiving and supporting an inflatable rubber tire on said half rims, means on each of said half spindles for maintaining the half rim thereon, spring means on each of said half spindles for urging said half rims toward each other, and a spreader collar on each of said half spindles each comprising a pair of half collars each having a plurality of stepped planar recessed segments interchangeably abuttable with each other for lengthening and shortening said spreader collars for limiting movement of said half rims away from each other a distance dependent upon the width of tire mounted on said half rims.

2. In a tire buffing machine a tire support articulatable horizontally for presenting a tire tangentially to a rotating buffing drum comprising a fork-like yoke having vertically disposed arms openable relative to each other, axially alignable abuttable half spindles journaled one on each of said arms, a split disc wheel including a half rim slidably mounted one on each of said half spindles for receiving a tire between them when said arms are opened relative to each other and adapted to support a tire thereon when said arms are closed relative to each other, means on the abuttable ends of each of said half spindles for retaining a half rim thereon, spring means on each of said half spindles between the adjacent arm and half rim for urging said half rims toward each other, to yieldably support a deflated tire in air sealed condition with respect to said half rims, and adapted to be fully compressed by said half rims during inflation of a tire thereon, means for latching said openable arms in closed condition relative to each other, means for introducing pressurized air to the tire supported on said half rims, a spreader on each of said half spindles for limiting movement of said half rims away from each other under the influence of the pressurized air entering said tire dependent upon the width of said tire.

3. In a tire buffing machine, a tire support articulatable horizontally for presenting a tire tangentially to a rotating buffing drum comprising a fork-like yoke having vertically disposed stationary and movable arms openable relative to each other, axially alignable abuttable half spindles journaled one on each of said arms, a split disc wheel including a half rim slidably mounted one on each of said half spindles for receiving a tire therebetween when said arms are opened relative to each other and to support a tire thereon when said arms are closed relative to each other, means on the abuttable ends of each of said half spindles for retaining a half rim thereon, motor means on one of said arms drivingly connected to the half spindle thereon for turning said tire during buffing thereof, said half spindle on the other one of said arms having an axial passage communicating with a source of pressurized air for admitting pressurized air between said split disc wheels to inflate the tire thereon, a spiral spring on each of said half spindles between the adjacent arm and half rim for urging said half rims toward each other to yieldably support a deflated tire in air sealed condition thereon and adapted to become fully compressed in flattened condition by said half rims during inflation of a tire thereon, means for latching said openable arms in closed condition relative to each other, and a spreader collar on each of said half spindles between the spiral spring thereon and the arm supporting the same for limiting outward movement of said split disc wheels under the influence of pressurized air therebetween when said spiral springs are fully compressed.

4. In a tire buffing machine, a tire support articulatable horizontally for presenting a tire tangentially to a rotating buffing drum comprising a fork-like yoke having vertically disposed stationary and movable arms openable relative to each other, axially alignable abuttable half spindles journaled one on each of said arms, a split disc wheel including a half rim slidably mounted one on each of said half spindles for receiving a tire therebetween when said arms are swung apart and to support a tire thereon when said arms are closed relative to each other, means on the abuttable ends of each of said half spindles for retaining a half rim thereon, motor means on said stationary arm drivingly connected to the half spindle thereon for turning said tire during buffing thereof, said other one of said half spindles having an axial passage communicating with a source of pressurized air for admitting pressurized air between said split disc wheels to inflate the tire thereon, spring means on each of said half spindles between the adjacent arm and half rim for urging said half rims toward each other, a spreader collar on each of said half spindles between said disc wheel and the arm supporting the same comprising a pair of half collars each having a plurality of segmental and stepped planar recesses interchangeably abuttable with each other to lengthen and shorten said spreader collars dependent upon the width of the tire supported on said split half rims, for limiting outward movement of said split disc wheels under the influence of pressurized air therebetween, and means at the open ends of said yoke arms for latching said openable arms in parallel relation.

5. In a tire buffing machine a tire support articulatable horizontally for presenting a tire tangentially to a rotating buffing drum comprising a fork-like yoke having vertically disposed arms, axially alignable abuttable half spindles journaled one on each said arms, a split disc wheel including a half rim mounted one on each of said half spindles for receiving a tire between them when said arms are opened relative to each other and to support a tire thereon when said arms are closed relative to each other, means for latching said openable arms in closed condition relative to each other, each of said half rims including a tire retaining flange on its outer side whereby to obtain air sealed contact between the beads of said tire and said half rims, and step-up rings for each of said half rims comprising a stretch band adapted to be stretched around said half rims in air sealed relation thereto, each said stretch band having a tire retaining bead thereon recessed along its outer edge in conformity to the tire retaining flange on the outer side of said half rims for supporting said step-up rings on said half rims against the outward pressure of said tire beads during inflation of a tire thereon.

6. In a tire buffing machine a tire support mounted on a horizontal swingable arm for presenting the tread of a tire tangentially to a rotary buffer comprising an openable fork like yoke having a pin extending vertically downward from the bight portion of said yoke and pivotally mounted on the end of said swingable arm, said yoke including a fixed vertical arm integral with the bight portion of said yoke and a movable arm pivotally mounted on the bight portion of said yoke, axially alignable abuttable half spindles journaled one on each of said arms, a split wheel including a half rim mounted one on each of said half spindles for receiving a tire between them when said yoke arms are open relative to each other and adapted to support a tire thereon when said yoke arms are closed relative to each other, and latch means at the upper end of each of said yoke arms for releasably latching the latter in closed condition.

7. In a tire buffing machine a tire support mounted on a horizontal swingable arm for presenting the tread of a tire tangentially to a rotary buffer comprising an openable fork like yoke having a pin extending vertically downward from the bight portion of said yoke and pivotally mounted on the end of said swingable arm, said yoke including a fixed vertical arm integral with the bight portion of said yoke and a movable arm pivotally mounted on the bight portion of said yoke, axially alignable abuttable half spindles journaled one on each of said arms, a split wheel including a half rim mounted one on each of said half spindles for receiving a tire between them when said yoke arms are open relative to each other and adapted to support a tire thereon when said yoke arms are closed relative to each other, latch means at the upper end of each of said yoke arms for releasably latching the latter in closed condition, an extension on said movable yoke arm, and an extension on said fixed yoke arm substantially parallel to the extension on said movable yoke arm, and compressive means between said extensions for cushioning the momentum of said movable yoke arm away from said fixed yoke arm when said yoke arms are opened relative to each other.

8. In a tire buffing machine a tire support mounted on a horizontal swingable arm for presenting the tread of a tire tangentially to a rotary buffer comprising a fork like yoke having a pin extending vertically downward from the bight portion of said yoke pivotally mounted on the end of said swingable arm, said yoke including a fixed vertical arm integral with the bight portion of said yoke and a movable arm pivotally mounted on the bight portion of said yoke, axially alignable abuttable half spindles journaled one on each of said arms, a split wheel including a half rim slidably mounted one on each of said half spindles for receiving a tire between them when said yoke arms are open relative to each other and adapted to support a tire thereon when said yoke arms are closed relative to each other, retaining means on the abuttable ends of each of said half spindles for retaining the half rims thereon, yieldable means on each of said half spindles between the adjacent yoke arm and half rim thereon for urging the latter toward the means for retaining said half rim thereon, latch means at the upper end of each of said yoke arms for latching the latter in closed condition, and compression means between said fixed and movable yoke arms for limiting and cushioning the momentum of movement of said movable yoke arm away from said fixed yoke arms when said yoke arms are opened to remove and receive a tire between said split rims.

9. In a tire buffing machine a tire support mounted on a horizontal swingable arm for presenting the tread of a tire tangentially to a rotary buffer comprising a fork like yoke having a pin extending vertically downward from the bight portion of said yoke pivotally mounted on the end of said swingable arm, said yoke including a fixed vertical arm integral with the bight portion of said yoke and a movable arm pivotally mounted on the bight portion of said yoke, axially alignable abuttable half spindles journaled one on each of said arms, a split wheel including a half rim slidably mounted one on each of said half spindles for receiving a tire between them when said yoke arms are open relative to each other and adapted to support a tire thereon when said yoke arms are closed relative to each other, latch means at the upper end of each of said yoke arms for latching the latter in closed condition, retaining means on the abuttable ends of each of said half spindles for retaining the half rims thereon, yieldable spring means on each of said half spindles between the adjacent yoke arm and half rim thereon for urging the latter toward each other for supporting a tire in relaxed condition on said half rims, said spring means being adapted to fully compress when said half rims are urged apart during inflation of a tire thereon, and a longitudinally adjustable collar on each of said half spindles between said adjacent yoke arm and spring means for limiting movement of said half rims away from each other a distance depending upon the width of tire mounted on said half rims when said tire is inflated.

References Cited in the file of this patent

UNITED STATES PATENTS

| | | |
|---|---|---|
| 1,016,184 | Thompson | Jan. 30, 1912 |
| 1,082,508 | Elwell | Dec. 30, 1913 |
| 1,624,913 | Ames | Apr. 19, 1927 |
| 2,390,008 | Sherwood et al. | Nov. 27, 1945 |
| 2,517,167 | Arel | July 18, 1950 |
| 2,601,120 | Lyman | June 17, 1952 |
| 2,614,603 | Howley | Oct. 21, 1952 |
| 2,636,277 | Hawkinson | Apr. 28, 1953 |
| 2,650,437 | Glynn | Sept. 1, 1953 |
| 2,672,651 | Smyser | Mar. 23, 1954 |
| 2,695,520 | Karsai | Nov. 30, 1954 |
| 2,745,137 | Glynn | May 15, 1956 |
| 2,866,228 | French | Dec. 30, 1958 |
| 2,866,500 | George et al. | Dec. 30, 1958 |
| 2,872,978 | Bakke | Feb. 10, 1959 |
| 2,888,065 | Neilsen | May 26, 1959 |
| 2,924,255 | Robbins | Feb. 9, 1960 |
| 2,992,675 | Bakke | July 18, 1961 |